(12) United States Patent
Fukui et al.

(10) Patent No.: US 12,280,756 B2
(45) Date of Patent: Apr. 22, 2025

(54) VEHICLE DRIVING ASSISTANCE APPARATUS

(71) Applicants: TOYOTA JIDOSHA KABUSHIKI KAISHA, Toyota (JP); DENSO CORPORATION, Toyota (JP)

(72) Inventors: Yusuke Fukui, Toyota (JP); Yuzo Kaneshige, Toyota (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 130 days.

(21) Appl. No.: 18/164,074

(22) Filed: Feb. 3, 2023

(65) Prior Publication Data

US 2023/0264663 A1 Aug. 24, 2023

(30) Foreign Application Priority Data

Feb. 22, 2022 (JP) ................... 2022-025777

(51) Int. Cl.
*B60Q 5/00* (2006.01)
*B60T 7/22* (2006.01)
(Continued)

(52) U.S. Cl.
CPC ............... *B60T 7/22* (2013.01); *B60Q 5/006* (2013.01); *B60W 30/08* (2013.01);
(Continued)

(58) Field of Classification Search
CPC ............. B60Q 5/006; B60T 7/12; B60T 7/22; B60T 2201/03; B60T 2201/022; B60T 2210/32; B60T 2220/00; B60W 30/08; B60W 30/095; B60W 30/0956; B60W 30/18154; B60W 30/18159; B60W 40/04;
(Continued)

(56) References Cited

U.S. PATENT DOCUMENTS

| | | |
|---|---|---|
| 9,105,190 B2 | 8/2015 | Akiyama |
| 9,393,960 B2 | 7/2016 | Kodaira |

(Continued)

FOREIGN PATENT DOCUMENTS

| | | |
|---|---|---|
| JP | 2005-134971 A | 5/2005 |
| JP | 2005-173703 A | 6/2005 |

(Continued)

*Primary Examiner* — Erick R Solis
(74) *Attorney, Agent, or Firm* — Sughrue Mion, PLLC

(57) ABSTRACT

A vehicle driving assistance apparatus includes a control unit configured to, in a case where the control unit determines, based on radar target object information, that at least one target control object that is approaching so as to intersect with a predicted traveling path of the host vehicle is present, when a line of vision of the driver detected by a driver monitor device is not directed to the target control object that will reach the intersecting position at the earliest time, perform at least one of a host vehicle traveling suppression control (e.g., a brake hold control to prohibit the host vehicle from moving) and an attention seeking warning control to generate a warning sound so as to cause the driver to recognize that there is a warning sound source in a direction along which the target control object is approaching the host vehicle.

5 Claims, 8 Drawing Sheets

(51) Int. Cl.
    *B60W 30/08*     (2012.01)
    *B60W 30/095*     (2012.01)

(52) U.S. Cl.
    CPC ...... *B60W 30/095* (2013.01); *B60T 2201/022* (2013.01); *B60T 2210/32* (2013.01); *B60T 2220/00* (2013.01)

(58) Field of Classification Search
    CPC ......... B60W 40/08; B60W 2040/0818; B60W 2040/0863; B60W 2554/4047; B60W 2554/4048; B60W 2554/4049
    USPC .......................................................... 701/70
    See application file for complete search history.

(56) References Cited

U.S. PATENT DOCUMENTS

| | | | |
|---|---|---|---|
| 9,483,945 | B2 | 11/2016 | Okita et al. |
| 9,873,412 | B2 | 1/2018 | Moriizumi |
| 10,137,893 | B2* | 11/2018 | Hanna ................... G06V 20/597 |
| 10,793,147 | B2 | 10/2020 | Kaminade |
| 11,417,123 | B2* | 8/2022 | Inagaki ...................... G08G 1/09 |
| 2016/0272215 | A1* | 9/2016 | Laine .................... G06V 20/597 |
| 2019/0039628 | A1* | 2/2019 | Mizuno ................... G08G 1/165 |
| 2019/0086511 | A1 | 3/2019 | Takeuchi et al. |
| 2019/0135295 | A1 | 5/2019 | Sato et al. |
| 2020/0247318 | A1* | 8/2020 | Yamamuro ............ B60Q 9/008 |
| 2021/0061309 | A1 | 3/2021 | Kawanai |
| 2021/0107521 | A1 | 4/2021 | Fujita et al. |
| 2021/0107528 | A1 | 4/2021 | Fujita et al. |
| 2021/0146956 | A1 | 5/2021 | Fujita et al. |
| 2021/0146958 | A1 | 5/2021 | Tanaka et al. |
| 2021/0165220 | A1* | 6/2021 | Nakada ................. B60W 40/08 |
| 2021/0263519 | A1* | 8/2021 | Ogino ................ B60W 60/0015 |

FOREIGN PATENT DOCUMENTS

| | | |
|---|---|---|
| JP | 2006-277547 A | 10/2006 |
| JP | 2007-133692 A | 5/2007 |
| JP | 2012-212351 A | 11/2012 |
| JP | 2013-152700 A | 8/2013 |
| JP | 2014-002610 A | 1/2014 |
| JP | 2016-038866 A | 3/2016 |
| JP | 2019-052987 A | 4/2019 |
| JP | 2019-087029 A | 6/2019 |
| JP | 2019-087143 A | 6/2019 |

* cited by examiner

VEHICLE DRIVING ASSISTANCE APPARATUS

TECHNICAL FIELD

The present disclosure relates to a vehicle driving assistance apparatus which performs, when an object to which a driver of a host vehicle should pay attention is present diagonally in front of the host vehicle, a control to avoid/prevent a near-collision (abnormal closeness) between the host vehicle and the object.

BACKGROUND

There has been a known vehicle surrounding monitoring device utilizing diagonally frontward radars (e.g., a front left side radar and a front right side radar). One of such monitoring devices (hereinafter, referred to as a conventional device) detects a target object that is approaching a predicted traveling path of the host vehicle so as to intersect with the predicted traveling path, using the diagonally frontward radars. Hereinafter, the target object that is approaching the predicted traveling path of the host vehicle so as to intersect with the predicted traveling path is sometimes referred to as a "target intersecting object". A position at which the predicted traveling path of the host and a predicted path of the target intersecting object intersect with each other is sometimes referred to as a "predicted intersecting position".

The conventional device acquires a time length (referred to as an "intersecting time length") for the detected target intersecting object to reach the predicted intersecting position. When the acquired intersecting time length becomes shorter than an intersecting time length threshold, the conventional device displays an attention seeking image (warning image) on a display.

This attention seeking image is an image indicating a direction (either a leftward direction or a rightward direction) along which the target intersecting object is coming/approaching (refer to Japanese Patent Application Laid-Open No. 2019-52987 (e.g., paragraphs [0075] to [0080], and FIG. 3)).

Furthermore, when the acquired intersecting time length becomes shorter than the intersecting time length threshold, the conventional device preforms a brake assistance control by transmitting an instruction to a brake ECU. The brake assistance control is a control to apply a "brake force that is greater than a brake force normally applied to the host vehicle depending on a brake operation by the driver" to the host vehicle, when the driver performs a brake operation. Note that Japanese Patent Application Laid-Open No. 2014-2610 discloses a related device.

SUMMARY

However, a driver of the host vehicle does not necessarily visually recognize (watch) the target intersecting object, and therefore, there is a possibility that the host vehicle comes excessively close to the target intersecting object. More specifically, as shown in FIG. 8, there is a case where the host vehicle HV temporally stops in front of an intersection IN, and then, a truck TR coming from the right side decelerates or stops for the host vehicle HV.

In this case, the conventional device recognizes the truck TR as the target intersecting object before the truck TR starts decelerating, and starts displaying the attention seeking image. This causes the driver of the host vehicle HV to recognize that the truck TR is approaching and to watch the truck TR. When the driver of the host vehicle HV visually recognizes that the truck TR decelerates or stops, the driver takes his/her foot off a brake pedal while watching the truck TR, so as to let the host vehicle HV move forward. At this time point, the conventional device detects a bicycle BY that is approaching from the left side and displays the attention seeking image for the bicycle BY. However, the driver of the host vehicle HV has already been paying attention to (watching) the truck TR, and thus, the driver does not visually recognize the attention seeking image for the bicycle BY. Consequently, the bicycle BY and the host vehicle HV may become too close to each other.

The present disclosure is made to cope with the problem described above. That is, one of objectives of the present disclosure is to provide a vehicle driving assistance apparatus capable of decreasing a possibility that the host vehicle comes too close to (has a near-collision with) the target intersecting object.

In order to solve the above problem, an embodiment of a vehicle driving assistance apparatus according to the present disclosure comprises:

one or more of sensors (41, 51) configured to be capable of obtaining information on a target object that is present in front of a host vehicle on the left and a target object that is present in front of the host vehicle on the right;

a driver monitor device (60) configured to be capable of detecting a line of vision of a driver of the host vehicle; and a control unit (10).

The control unit (10) is configured to, when the control unit determines, based on the information obtained by the one or more of sensors, that at least one target intersecting object that is a target object approaching from a side of the vehicle to a predicted traveling path of the host vehicle so as to intersect with the predicted traveling path of the host vehicle is present (step 420), and when the control unit determines that a specific state in which the line of vision of the driver detected by the driver monitor device is not directed to a target control object is occurring, wherein the target control object is a target object that is predicted to reach a position at which the target object is predicted to intersect with the predicted traveling path of the host vehicle at the earliest time among the target intersecting objects (if there is only one target intersecting object, the target control object is the target intersecting object) (step 460: Yes), perform at least one of a host vehicle traveling suppression control (step 530, step 550, step 760) and an attention seeking warning control (step 540), the host vehicle traveling suppression control being a control to automatically apply a brake force to the host vehicle, using a brake device of the host vehicle, in such a manner that the host vehicle does not reach a predicted intersecting position at which the predicted traveling path of the host vehicle and a predicted path of the target control object intersect with each other, and the attention seeking warning control being a control to generate a warning sound to the driver, using a warning device of the host vehicle, so as to cause the driver to recognize that there is a warning sound source in either a left direction or a right direction along which the target control object is approaching the host vehicle.

According to the above-described embodiment, at least one of the host vehicle traveling suppression control and the attention seeking warning control is performed, when at least one target intersecting object that is a target object approaching from a side of (and in front of) the vehicle to/toward the predicted traveling path of the host vehicle so as to intersect with the predicted traveling path of the host vehicle is present (step 420), and the specific state in which the line of vision of the driver detected by the driver monitor device is not directed to a target control object is occurring, wherein the target control object is a target object that is predicted to reach a position at which the target object is predicted to intersect with the predicted traveling path of the host vehicle at the earliest time among the target intersecting objects.

Therefore, in a case where the host vehicle traveling suppression control is performed, the host vehicle does not reach the predicted intersecting position between the host vehicle and the target control object even when the driver attempts to move/travel the host vehicle without recognizing/noticing the target control object. Accordingly, a possibility that the near-collision (abnormal closeness) between the host vehicle and the target control object occurs can be decreased.

Whereas, in a case where the attention seeking warning control is performed, a possibility that the driver attempts to move/travel the host vehicle without recognizing/noticing the target control object can be decreased. Accordingly, the possibility that the near-collision (abnormal closeness) between the host vehicle and the target control object occurs can be decreased.

In some embodiments of the present disclosure, the control unit is configured to, if the host vehicle is in a stopped state when the specific state is determined to be occurring (step 520 shown in FIG. 5: Yes), perform, as the host vehicle traveling suppression control, a brake hold control being a control to forcefully apply a brake force for stopping the host vehicle to the host vehicle, using the brake device of the host vehicle, in such a manner that the host vehicle continues being stopped (step 530).

According to the above-described embodiment, even when the driver of the host vehicle attempts to start moving the host vehicle without recognizing/noticing the target control object (for example, when the driver takes his/her foot off (releases) the brake pedal, or when the driver presses on the acceleration pedal), the host vehicle is maintained at the stopped state. Thus, the possibility that the near-collision (abnormal closeness) between the host vehicle and the target control object occurs can surely be decreased.

In some embodiments of the present disclosure, the control unit is configured to, if the host vehicle is not in the stopped state when the specific state is determined to be occurring (step 520 shown in either FIG. 5 or FIG. 7: No), perform, as the host vehicle traveling suppression control, a collision avoidance automatic brake control to forcefully apply "a brake force for avoiding a collision" to the host vehicle, using the brake device of the host vehicle, in such a manner that the host vehicle stops in front of (at a position away from) the predicted intersecting position (step 550, step 760).

According to the above-described embodiment, a case where the driver of the host vehicle moves the host vehicle to reach the predicted intersecting position between the host vehicle and the target control object is prevented/avoided. Thus, the possibility that the near-collision (abnormal closeness) between the host vehicle and the target control object occurs can surely be decreased.

In some embodiments of the present disclosure, the control unit is configured to, if the host vehicle is in a stopped state when the specific state is determined to be occurring (step 520 shown in FIG. 7: Yes), perform a start moving driving force suppression control to control a drive source of the host vehicle in such a manner that a diving force equal to or smaller than a creeping force that is applied to the host vehicle when the acceleration pedal of the host vehicle is released is applied to the host vehicle, even when an acceleration pedal is operated (step 730).

According to the above-described embodiment, even when the driver operates the acceleration pedal of the host vehicle in a case there is a high possibility that the driver has not recognized/noticed the target control object yet, the host vehicle starts moving at an extremely low acceleration (very slowly/gradually). This can increase a possibility that the driver recognizes the target control object and stops the host vehicle. Therefore, the possibility that the near-collision (abnormal closeness) between the host vehicle and the target control object occurs can surely be decreased.

In some embodiments of the present disclosure, the control unit is configured to:

obtain an intersecting time length that is a time length for the target control object to reach the predicted intersecting position; and starts at least one of the host vehicle traveling suppression control and the attention seeking warning control (step 470), when the intersecting time length is shorter than an intersecting time length threshold (step 440: Yes).

According to the above-described embodiment, a "case where the host vehicle traveling suppression control and/or the attention seeking warning control are/is performed when they are actually unnecessary" can be avoided.

The present disclosure includes a method for performing the functions that the above-described vehicle driving assistance apparatus performs, and a program storage device, that is readable by a machine/computer, for storing a program for causing the computer to implement processes that the above-described vehicle driving assistance apparatus performs.

Notably, in the above description, in order to facilitate understanding of the present disclosure, the constituent elements or the like of the disclosure corresponding to those of the embodiments of the disclosure which will be described later are accompanied by parenthesized symbols which are used in the embodiments. However, the constituent elements of the disclosure should not be limited to those in the embodiments defined by the symbols.

DETAILED DESCRIPTION

Configuration

Figure 1:
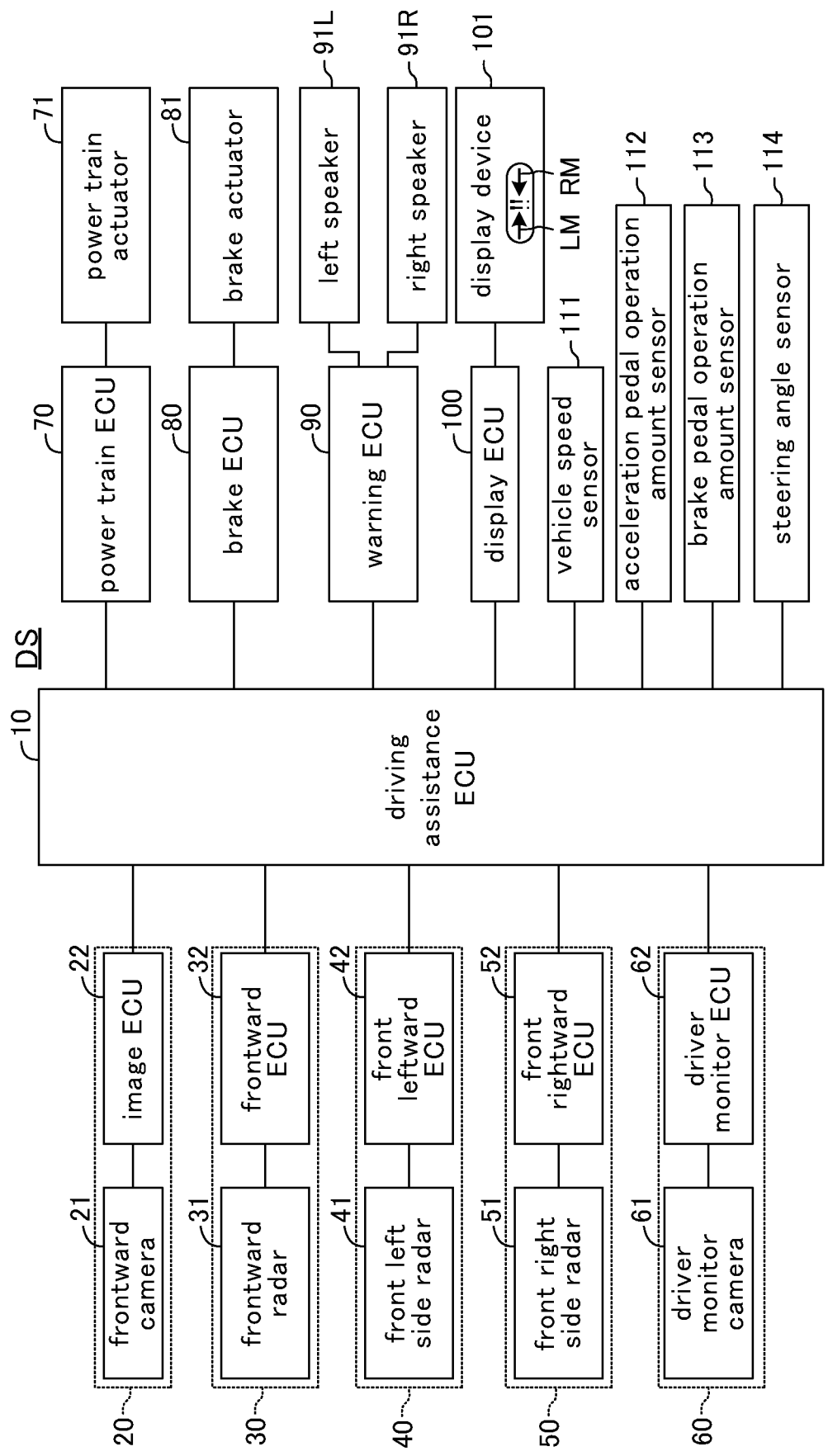
FIG. 1 is a schematic diagram of a vehicle driving assistance apparatus according to an embodiment of the present disclosure.

A "vehicle driving assistance apparatus (supporting/assistance apparatus) DS according to an embodiment of the present disclosure" shown in FIG. 1 is applied to (or installed in) a vehicle (hereinafter, referred to as a "host vehicle" in order to discriminate the vehicle from other vehicles) shown in FIG. 2.

As shown in FIG. 1, the assistance apparatus DS comprises a driving support/assistance ECU 10, a frontward camera device 20, a frontward radar device 30, a front left side radar device 40, a front right side radar device 50, a driver monitor device 60, a power train ECU 70, a power train actuator 71, a brake ECU 80, a brake actuator 81, a warning ECU 90, a left speaker 91L, a right speaker 91R, a display ECU 100, a display device 101, a vehicle speed sensor 111, an acceleration pedal operation amount sensor 112, a brake pedal operation amount sensor 113, and a steering angle sensor 114.

In the present specification, an "ECU" means an "Electronic Control Unit" that includes, as a main component, a microcomputer, and is sometimes referred to as a controller or a computer. The microcomputer includes a CPU (processor), a ROM, a RAM, a non-volatile memory, and an interface (I/F). The CPU is configured and/or programmed to realize various functions by executing instructions (routines, or programs) stored in the ROM (memory, storage device). Some or all of a plurality of the ECUs may be integrated into a single ECU. These ECUs are connected with each other so as to be able to mutually exchange data/information through a CAN (Controller Area Network).

Figure 2:
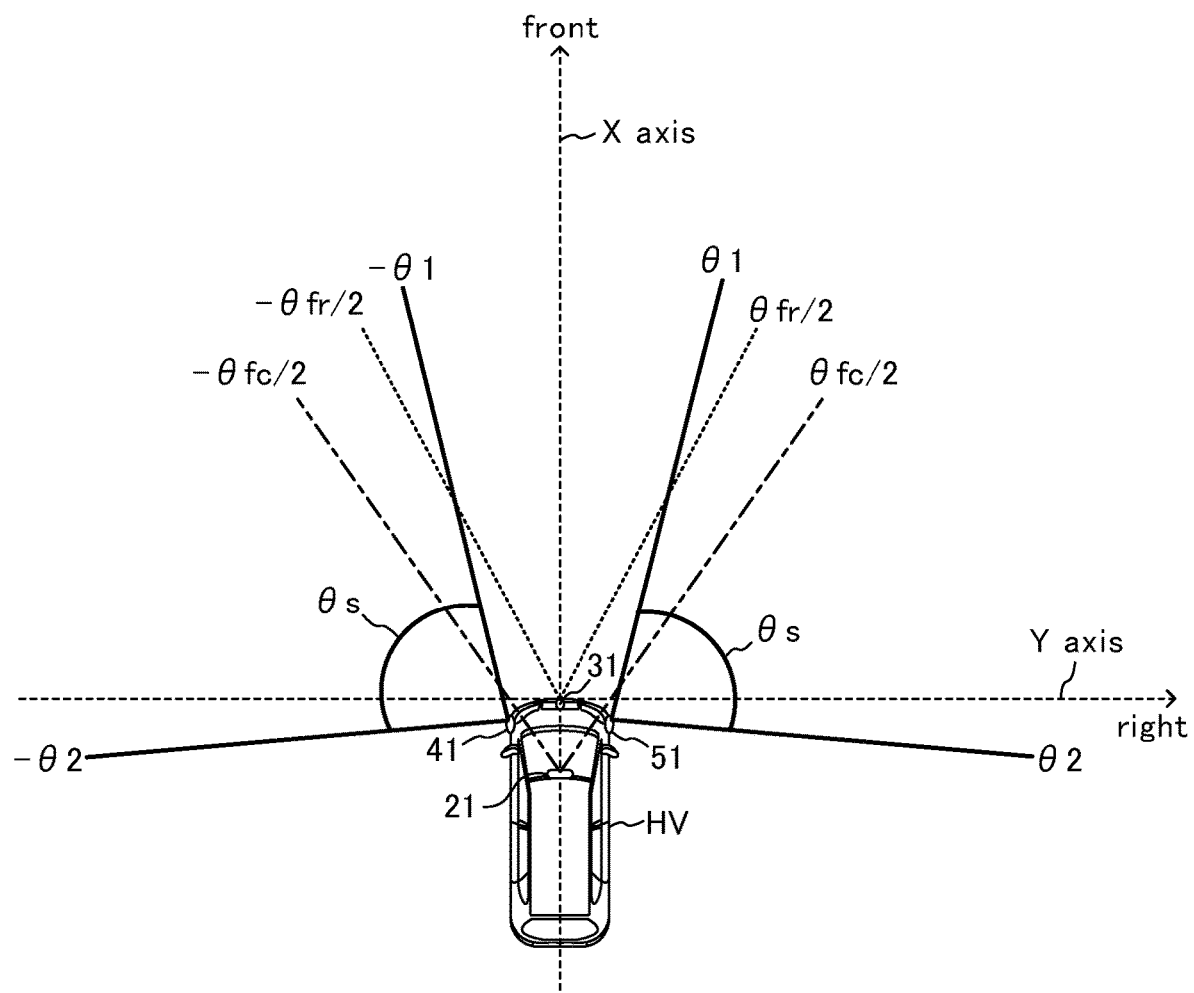
FIG. 2 is a plan view of a host vehicle and a surrounding of the host vehicle, for illustrating a detection area of each radar.

As shown in FIG. 2, a plurality of the ECUs calculates "a position, a relative speed, or the like" of a target object with respect to the host vehicle HV using an orthogonal coordinate system (having an X axis, and a Y axis) as described below.

Origin: a center position in a vehicle width direction at a front end of the host vehicle.

X axis: an axis passing through the origin and extending along a front-rear direction of the host vehicle HV. A positive direction of the X axis is the frontward direction of the host vehicle HV.

Y axis: an axis passing through the origin and extending along a left-right (vehicle width) direction of the host vehicle HV. A positive direction of the Y axis is the rightward direction of the host vehicle HV.

The driving assistance ECU 10 is a main ECU of the assistance apparatus DS, and is configured to perform a driving assistance control (e.g., a host vehicle traveling suppression control, an attention seeking warning control, or the like) as described later.

The frontward camera device 20 includes a frontward camera 21 and an image ECU 22.

As shown in FIG. 2, the frontward camera 21 is arranged at an upper and center position of a front windshield of the host vehicle HV. The frontward camera 21 is a stereo camera that obtains a pair of right and left image data by taking (capturing) a picture of a scene (including a road surface and a target object) ahead of (in front of) the host vehicle HV every time a predetermined time elapses. An imaging area (i.e., an angle of view) of the frontward camera 21 is a sectoral area in a plan view, whose center coincides with the X axis and whose center angle is $\theta fc$. Namely, the frontward camera 21 captures a scene in the sectoral area having a predetermined angle ($\theta fc/2$) leftward from the frontward direction of the host vehicle HV and the angle ($\theta fc/2$) rightward from the frontward direction of the host vehicle HV.

The image ECU 22 analyzes the image data transmitted from the frontward camera 21 every time a predetermined time elapses to produce/generate image target object information. The image target object information includes a position of the target object, a relative speed of the target object, a type (kind) of the target object (i.e., a stationary object, a pedestrian, a bicycle, a motor cycle, an other vehicle, or the like), and position information regarding a lane.

The frontward radar device 30 is a device configured to obtain information on a target object that is present ahead of (in front of) the host vehicle HV. The frontward radar device 30 includes a frontward radar 31 and a frontward ECU 32.

As shown in FIG. 2, the frontward radar 31 is arranged at the above-described origin, and transmits (radiates) electric wave in a millimeter band to a detection area that is a sectoral area in a plan view, whose center axis (radar axis) coincides with the X axis and whose center angle is $\theta fr$. Namely, the frontward radar 31 transmits (radiates) the electric wave to the sectoral area having a predetermined angle ($\theta fr/2$) leftward from the frontward direction of the host vehicle HV and the angle ($\theta fr/2$) rightward from the frontward direction of the host vehicle HV.

When a target object is present in the detection area (radar radiated area) of the frontward radar 31, the target object reflects the electric wave radiated/transmitted from the frontward radar 31. As a result, a reflected wave is generated. The frontward radar 31 receives the reflected wave. The frontward radar 31 transmits information on the transmitted electric wave and information on the received reflected wave, to the frontward ECU 32, every time a predetermined time elapses.

The frontward ECU 32 obtains, based on the information transmitted from the frontward radar 31, target object information on the target object that is present in the detection area of the frontward radar 31. This target object information is referred to as "frontward radar target object information", and includes a distance between the origin and the target object, a direction (orientation) of the target object, and a relative speed of the target object.

The front left side radar device 40 is a device configured to obtain information on a target object that is present in front of the host vehicle HV on the left side (i.e., in front of the host vehicle, and diagonally to the left and to the left). The front left side radar device 40 includes a front left side radar 41 and a front leftward ECU 42.

As shown in FIG. 2, the front left side radar 41 is arranged at a left corner of the front end of the host vehicle HV, and transmits (radiates) electric wave in a millimeter band to a detection area that is a sectoral area in a plan view, whose center axis (radar axis) extends diagonally leftward in front of the host vehicle HV. Namely, the front left side radar 41 transmits the electric wave in the sectoral area whose center angle is $\theta s$ (between an angle $(-\theta 2)$ and an angle $(-\theta 1)$). When a target object is present in the detection area (radar radiated area) of the front left side radar 41, the target object reflects the electric wave radiated/transmitted from the front left side radar 41. As a result, a reflected wave is generated. The front left side radar 41 receives the reflected wave. Similarly to the frontward radar 31, the front left side radar 41 transmits information on the transmitted electric wave and information on the received reflected wave, to the front leftward ECU 42, every time a predetermined time elapses.

The front leftward ECU 42 obtains, based on the information transmitted from the front left side radar 41, target object information on the target object that is present in the detection area of the front left side radar 41. This target object information is referred to as "front leftward radar target object information", and includes a distance between the origin and the target object, a direction (orientation) of the target object, and a relative speed of the target object.

The front right side radar device 50 is a device configured to obtain information on a target object that is present in front of the host vehicle HV on the right side (i.e., in front of the host vehicle, and diagonally to the right and to the right). The front right side radar device 50 includes a front right side radar 51 and a front rightward ECU 52.

As shown in FIG. 2, the front right side radar 51 is arranged at a right corner of the front end of the host vehicle HV, and transmits (radiates) electric wave in a millimeter band to a detection area that is a sectoral area in a plan view, whose center axis (radar axis) extends diagonally rightward in front of the host vehicle HV. Namely, the front right side radar 51 transmits the electric wave in the sectoral area whose center angle is θs (between an angle (+θ2) and an angle (+θ1)). When a target object is present in the detection area (radar radiated area) of the front right side radar 51, the target object reflects the electric wave radiated/transmitted from the front right side radar 51. As a result, a reflected wave is generated. The front right side radar 51 receives the reflected wave. Similarly to the frontward radar 31, the front right side radar 51 transmits information on the transmitted electric wave and information on the received reflected wave, to the front rightward ECU 52, every time a predetermined time elapses.

The front rightward ECU 52 obtains, based on the information transmitted from the front right side radar 51, target object information on the target object that is present in the detection area of the front right side radar 51. This target object information is referred to as "front rightward radar target object information", and includes a distance between the origin and the target object, a direction (orientation) of the target object, and a relative speed of the target object.

The driver monitor device 60 is a driver monitor configured to obtain information indicative of a state (including a line of vision) of the driver of the host vehicle HV, and includes a driver monitor camera 61 and a driver monitor ECU 62. The driver monitor device 60 itself is well-known, and is disclosed in, for example, Japanese Patent Application Laid-Open No. 2019-87143, Japanese Patent Application Laid-Open No. 2019-87029, Japanese Patent Application Laid-Open No. 2016-38866, and Japanese Patent Application Laid-Open No. 2013-152700.

The driver monitor camera 61 is arranged at an appropriate position (e.g., an upper position of a steering column) in front of a driver's seat of the host vehicle HV, and take a picture of a face of the driver of the host vehicle every time a predetermined time elapses so as to produce/generate face image data.

The driver monitor ECU 62 detects, based on the face image data transmitted from the driver monitor camera 61, "a direction of the face and a line of vision, or the like" of the driver of the host vehicle HV.

More specifically, data indicative of a shape of a face of the driver when he/she faces forward has been stored in the driver monitor ECU 62 in advance. The driver monitor ECU 62 produces/generates a face image of the driver based on the face image data transmitted from the driver monitor camera 61. The driver monitor ECU 62 rotates the produced face image to find out a rotation angle of when a match rate between the rotated face image and the stored data indicative of the shape of the face becomes maximum. The driver monitor ECU 62 detects the direction of the face based on the found rotation angle.

The driver monitor ECU 62 detects parts of the face by identifying a face area and by extracting feature points of the parts of the face including an eye, a nose, and a mouth from the produced face image of the driver. Furthermore, the driver monitor ECU 62 detects a position of a Purkinje image (corneal reflection image) and a position of a center of the pupil, and obtains a positional relationship between the position of the Purkinje image and the position of the center of the pupil. Then, the driver monitor ECU 62 detects the line of vision (eye direction) of the driver based the detected direction of the face and the obtained positional relationship between the position of the Purkinje image and the position of the center of the pupil.

The power train ECU 70 is connected with the power train actuator 71. The power train actuator 71 is an actuator to change an operating state of a drive device (that is a drive source of the host vehicle HV, and in the present example, is an internal combustion engine) of the host vehicle HV. In the present embodiment, the internal combustion engine is a gasoline fuel injection·spark ignition·multicylinder engine that has a throttle valve for adjusting an amount of intake air. The power train actuator 71 includes at least a throttle valve actuator that changes an opening degree of the throttle valve.

The power train ECU 70 is able to change a torque that the drive device generates by driving the power train actuator 71. The torque that the drive device generates is transmitted to unillustrated driving wheels via an unillustrated gear mechanism. Thus, the power train ECU 70 is able to control a driving force of the host vehicle HV by controlling the drive device through the power train actuator 71.

It should be noted that the drive device of the host vehicle HV may be an electric motor. In other words, the host vehicle HV may be an electric vehicle (i.e., either a fuel cell electric vehicle (FCEV) or a battery electric vehicle (BEV)). In this case, the power train actuator 71 may be an inverter that is capable of changing a torque of the electric motor. The drive device of the host vehicle HV may include both the internal combustion engine and the electric motor. In other words, the host vehicle HV may be a hybrid type vehicle (i.e., either a hybrid vehicle (HEV) or a plug-in hybrid vehicle (PHEV)). In this case, the power train actuator 71 may include the inverter that is capable of changing the torque of the electric motor and the throttle valve actuator of the internal combustion engine.

The brake ECU 80 is connected with a brake actuator 81. The brake actuator 81 is an actuator that is able to control each of friction brake devices (brake devices) provided to respective wheels of the host vehicle HV so as to change a brake force (frictional brake force) applied to the host vehicle HV. Thus, the brake ECU 80 is able to control the brake force applied to the host vehicle HV by controlling the brake devices through the brake actuator 81.

The warning ECU 90 is connected with the left speaker 91L and the right speaker 91R, and is able to cause each of the speakers to generate warning sounds. It should be noted that the left speaker 91L and the right speaker 91R may be any type of sound generating devices (warning sound generating devices), and may be replaced with a left buzzer and a right buzzer, respectively.

The left speaker 91L is arranged at a front-left position inside of a cabin of the host vehicle HV. Thus, when the warning sound is generated only from the left speaker 91L among the left speaker 91L and the right speaker 91R, the driver of the host vehicle HV can recognize that the warning sound is generated from the left side (front left side) of the driver of the host vehicle HV. Namely, in this case, the driver can recognize that there is a warning sound generation source in the left side (front left side) of the driver.

The right speaker 91R is arranged at a front-right position inside of the cabin of the host vehicle HV. Thus, when the warning sound is generated only from the right speaker 91R among the left speaker 91L and the right speaker 91R, the driver of the host vehicle HV can recognize that the warning sound is generated from the right side (front right side) of the driver of the host vehicle HV. Namely, in this case, the driver can recognize that there is a warning sound generation source in the right side (front right side) of the driver.

The display ECU 100 is connected with the display device 101 that includes a display.

The display ECU 100 is able to display the attention seeking image indicating a direction (a left direction or a right direction) along/in which the target intersecting object is coming (approaching), on the display device 101. For example, the display device 101 selectively display, as the attention seeking image, one of an image LM and an image RM, in accordance with an instruction from the display ECU 100. The image LM is an image with a figure (e.g., a rightward arrow) indicating that the target intersecting object is coming from the front left side of the host vehicle HV. The image RM is an image with a figure (e.g., a leftward arrow) indicating that the target intersecting object is coming from the front right side of the host vehicle HV. It should be noted that the display device 101 may be a so-called meter display. In addition, the attention seeking image may have been fixed, and may be displayed by turning on or off a lamp located behind the attention seeking image.

The driving assistance ECU 10 is further connected with the following sensors, and receives outputs (detected values) of those sensors.

A vehicle speed sensor 111 that detects a speed (i.e., vehicle speed SPD) of the host vehicle HV.

An acceleration pedal operation amount sensor 112 that detects an acceleration pedal operation amount AP of an unillustrated acceleration pedal of the host vehicle HV.

A brake pedal operation amount sensor 113 that detects a brake pedal operation amount BP of an unillustrated brake pedal of the host vehicle HV.

A steering angle sensor 114 that detects a steering angle (or a steered angle) Sa of the host vehicle HV.

It should be noted that the driving assistance ECU 10 is also connected with other operating state sensors for detecting the operating state of the host vehicle HV. Those operating state sensors include, for example, wheel rotational speed sensors of respective wheels, and a brake switch that generate an ON signal when the brake pedal is operated. In addition, some or all of sensors may be connected to an ECU other than the driving assistance ECU 10. In that case, the driving assistance ECU 10 receives a detected value of that sensor from the ECU to which that sensor is connected, via CAN.

Outline of Operation

The assistance apparatus DS operates/functions as follows in scenes including a scene shown in FIG. 3.

Figure 3:
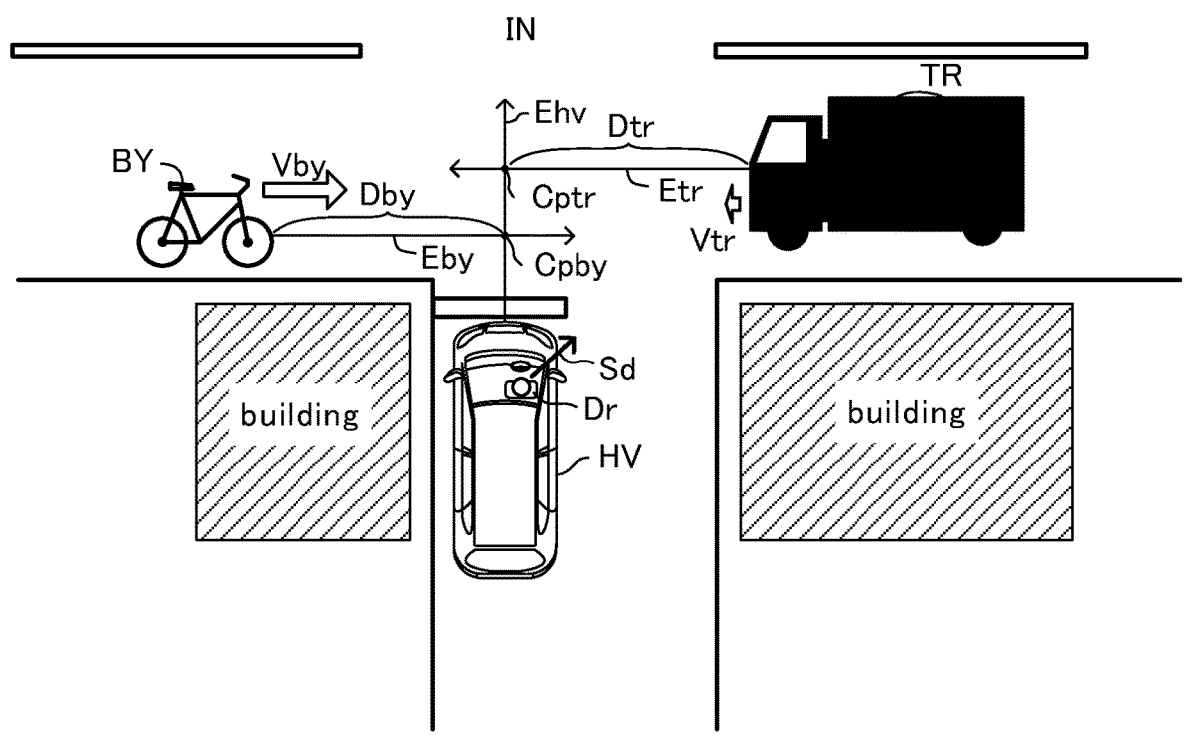
FIG. 3 is a drawing showing a specific scene for describing operations of the vehicle driving assistance apparatus shown in FIG. 1.

The scene shown in FIG. 3 is a scene where the following conditions/states are occurring.

The host vehicle HV has stopped in front of an intersection IN in order to enter the intersection IN.

A truck TR, coming from the right side and approaching a predicted traveling path Ehv of the host vehicle HV so as to intersect with the predicted traveling path Ehv, has decelerated or stopped for the host vehicle HV.

A bicycle BY, coming from the left side, is approaching the predicted traveling path Ehv of the host vehicle HV so as to intersect with the predicted traveling path Ehv.

In this case, the driver Dr of the hose vehicle HV is watching the truck TR coming closer to the predicted traveling path Ehv of the host vehicle HV earlier than the bicycle BY. When the driver Dr visually recognizes that the truck TR has decelerated or stopped, he/she takes his/her foot off the brake pedal to let the host vehicle HV move forward to the intersection IN. At this time point, the driver Dr of the host vehicle HV is not watching (visually recognizing) the bicycle BY, and thus, has not recognized the existence of the bicycle BY. Consequently, the bicycle BY and the host vehicle HV may become excessively/too close to each other.

In view of the above, the assistance apparatus DS detects the direction Sd of the line of vision of the driver Dr of the host vehicle HV, using the driver monitor device 60. When the direction Sd of the line of vision of the driver Dr is not the direction to the bicycle BY, the assistance apparatus DS causes the host vehicle HV to continue to stop (namely, prohibits the host vehicle HV from start moving) by applying the brake force to the host vehicle HV. Namely, the assistance apparatus DS performs a brake hold control. The assistance apparatus DS generates a warning sound from the front left side with respect to the driver Dr using the left speaker 91L so as to urge the driver Dr to watch the bicycle BY. Namely, the assistance apparatus DS performs an attention seeking warning control. This can decrease a possibility that the bicycle BY and the host vehicle HV becomes too close to each other (a possibility that a distance between the bicycle BY and the host vehicle HV becomes too short).

Specific Operation

The CPU of the driving assistance ECU 10 (hereinafter, simply referred to as the CPU) is configured or programmed to execute routines shown by flowcharts in FIGS. 4 and 5, every time a predetermined time elapses.

Setting of a Start Moving Suppression Flag

Figure 4:
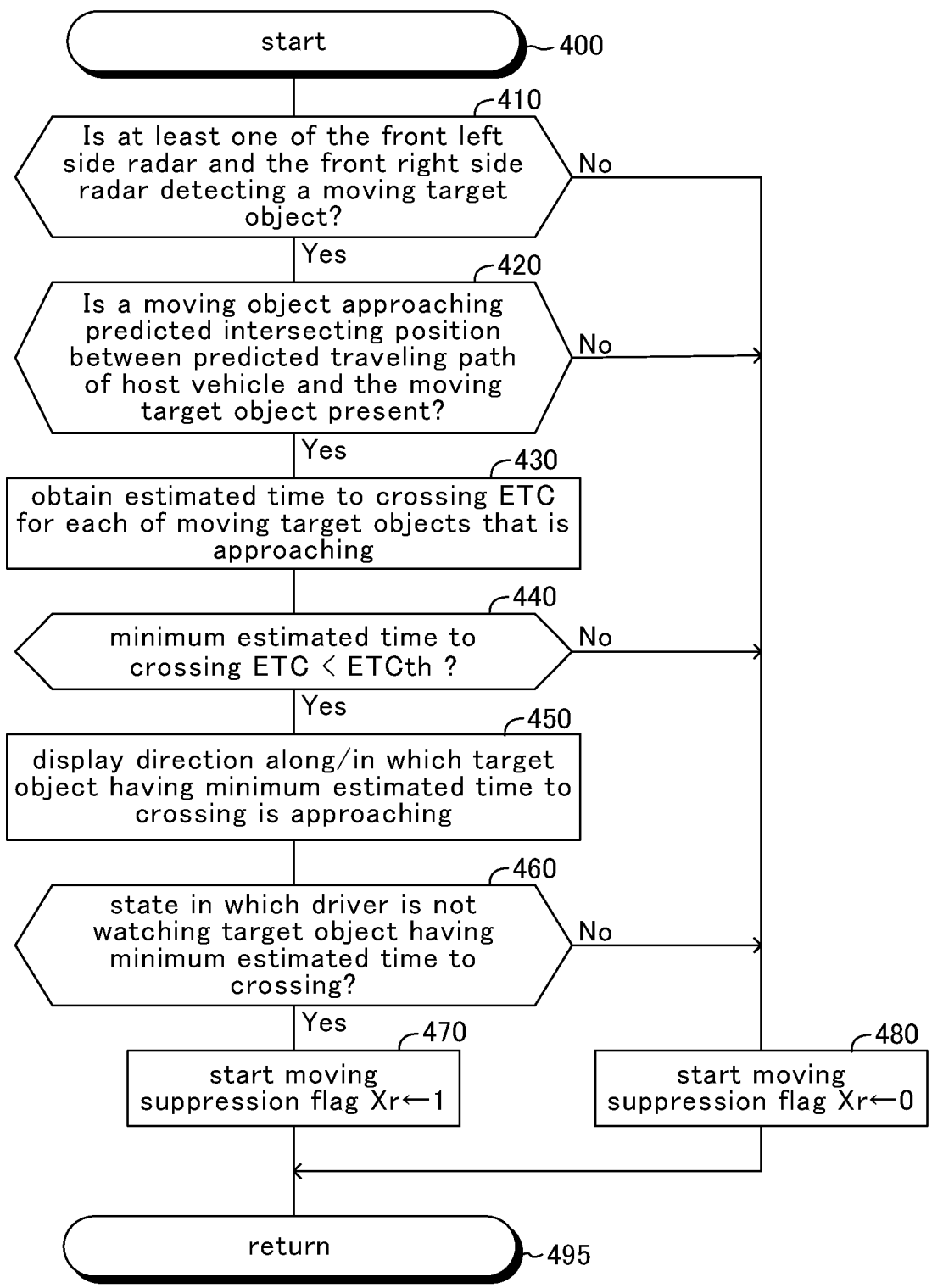
FIG. 4 is a flowchart illustrating a routine executed by a CPU of a driving assistance/support ECU shown in FIG. 1.

When an appropriate time point comes, the CPU starts processing from step 400 in FIG. 4, and proceeds to step 410. At step 410, the CPU determines, based on the front leftward radar target object information and the front rightward radar target object information, whether or not at least one of the front left side radar 41 and the front right side radar 51 detects a moving target object that is an object having a velocity. In other words, the CPU determines whether or not a moving target object that cannot be detected by any of the frontward camera 21 and the frontward radar 31 is present (i.e., whether or not there is/are one or both of a moving target object located in front of and to the left side of the host vehicle HV and a moving target object located in front of and to the right side of the host vehicle HV). Hereinafter, the moving target object that at least one of the front left side radar 41 and the front right side radar 51 detects is sometimes referred to as a "front laterally moving target object".

When at least one of the front left side radar 41 and the front right side radar 51 detects the moving target object (i.e., the front laterally moving target object is determined to be present), the CPU makes a "Yes" determination at step 410, and proceeds to step 420. At step 420, the CPU obtains a position (hereinafter referred to as a "predicted intersecting position Cp") at which a "predicted traveling path of the host vehicle" and a "predicted path of the front laterally moving target object" intersect with each other.

In the example shown in FIG. 3, the paths and the predicted intersecting position Cp are as follows.

Predicted traveling path of the host vehicle: Ehv
Predicted traveling path of the bicycle BY that is the front laterally moving target object: Eby
Predicted intersecting position Cp between the predicted traveling path Ehv of the host vehicle and the predicted traveling path Eby of the bicycle BY: Cpby
Predicted traveling path of the truck TR that is the front laterally moving target object: Etr
Predicted intersecting position Cp between the predicted traveling path Ehv of the host vehicle and the predicted traveling path Etr of the truck TR: Cptr The processes carried out by the CPU at step 420 will be described below more specifically.

Firstly, the CPU obtains the predicted traveling path Ehv of the host vehicle. The predicted traveling path Ehv of the host vehicle is a future path along which the host vehicle HV (the center position in the vehicle width direction at the front end of the host vehicle HV) will travel/move in a predetermined predicted period under the assumption that the host vehicle HV maintains "the steering angle Sa and the vehicle speed SPD" at the present time point. The predicted period is a period from the "present time point" to a "time point at which a predetermined constant time length (e.g., a few seconds) elapses from the present time point". It should be noted that a length (distance) of the predicted traveling path Ehv of the host vehicle is set to a length equal to or longer than a predetermined constant minimum length (e.g., a few meters). Accordingly, when the host vehicle HV stops (is not moving), the length of the predicted traveling path Ehv of the host vehicle is set to the minimum length.

Subsequently, the CPU obtains the predicted traveling path of the front laterally moving target object. The predicted traveling path of the front laterally moving target object is a future path along which the front laterally moving target object will travel/move in the predicted period. More specifically, the CPU obtains a moving direction of the front laterally moving target object based on at least:
"a last (newest) position of the front laterally moving target object";
"a position of the front laterally moving target object and a position of the host vehicle HV" a first predetermined time ($\Delta t$ sec.) before/ago; and
"a position of the front laterally moving target object and a position of the host vehicle HV" a second predetermined time ($2 \cdot \Delta t$ sec.) before/ago.

The CPU obtains the predicted traveling path of the front laterally moving target object (the path Eby and the path Etr, shown in FIG. 3) under the assumption that the front laterally moving target object will move while maintaining "the obtained moving direction of the front laterally moving target object and a speed of the front laterally moving target object" at the present time point. Thereafter, the CPU obtains, as the predicted intersecting position Cp (e.g., the predicted intersecting position Cpby and the predicted intersecting position Cptr, shown in FIG. 3), a position at which the predicted traveling path Ehv of the host vehicle and the predicted traveling path of the front laterally moving target object intersect with each other. Lastly, the CPU determines whether or not the front laterally moving target object is approaching (coming closer to) the predicted intersecting position between the predicted traveling path Ehv of the host vehicle and the front laterally moving target object.

When there is the front laterally moving target object that is approaching (coming closer to) the predicted intersecting position between the predicted traveling path Ehv of the host vehicle and the front laterally moving target object, the CPU makes a "Yes" determination at step 420, and proceeds to step 430. At step 430, the CPU obtains through calculation an estimated time to crossing ETC for each of the front laterally moving target objects approaching the respective predicted intersecting positions.

In the example shown in FIG. 3, each of the bicycle BY and the truck TR is moving straight. Thus, the estimated time to crossing ETC of each of them is calculated as follows.

the estimated time to crossing ETC of the bicycle
$$BY(=ETCby)=Dby/Vby$$

Here, Dby is a distance from the position of the bicycle BY at the present time point to the predicted intersecting position Cpby, and Vby is a ground speed of the bicycle BY in a direction toward the predicted intersecting position Cpby. It should be noted that a ground speed of a moving object can be obtained based on the traveling/moving direction of the host vehicle HV, the vehicle speed SPD of the host vehicle HV, the moving direction of the moving object, and the relative speed of the moving object with respect to the host vehicle HV.

the estimated time to crossing ETC of the truck
$$TR(=ETCtr)=Dtr/Vtr$$

Here, Dtr is a distance from the position of the truck TR at the present time point to the predicted intersecting position Cptr, and Vtr is a ground speed of the truck TR in a direction toward the predicted intersecting position Cptr.

Subsequently, the CPU proceeds to step 440. At step 440, the CPU selects/specifies a minimum (shortest) estimated time to crossing among the estimated times to crossing ETC of the front laterally moving target objects approaching (coming closer to) the respective predicted intersecting positions, and determines whether or not the selected minimum estimated time to crossing is shorter than a predetermined time to crossing threshold ETCth.

In the example shown in FIG. 3, the CPU selects/specifies a minimum (shortest) estimated time to crossing from among "the estimated time to crossing ETCby of the bicycle BY" and "the estimated time to crossing ETCtr of the truck TR" (whichever is shorter). In this example, the distance Dtr and the distance Dby are equal to each other, the truck TR substantially has stopped, and the bicycle BY has a velocity (is moving). Therefore, the minimum estimated time to crossing is the estimated time to crossing ETCby of the bicycle BY. Accordingly, at step 440, the CPU determines whether or not the estimated time to crossing ETCby is shorter than the time to crossing threshold ETCth. It should be noted that, when there is only one front laterally moving target object that is approaching (coming closer to) the predicted intersecting position, the estimated time to crossing of that front laterally moving target object is selected as the minimum estimated time to crossing.

When the minimum estimated time to crossing is shorter than the time to crossing threshold ETCth, the CPU makes a "Yes" determination at step 440, and proceeds to step 450.

When, at step 450, the CPU determines that the front laterally moving target object having the minimum estimated time to crossing ETC is approaching from the front left side of the host vehicle HV, the CPU sends an instruction to the display ECU 100 to cause the display ECU 100 to display "the image LM (refer to FIG. 1) with the rightward arrow" on the display device 101. Whereas, when, at step 450, the CPU determines that the front laterally moving target object having the minimum estimated time to crossing ETC is approaching from the front right side of the host vehicle HV, the CPU sends an instruction to the display ECU 100 to cause the display ECU 100 to display "the image RM (refer to FIG. 1) with the leftward arrow" on the display device 101.

Subsequently, the CPU proceeds to step 460. At step 460, the CPU determines whether or not a "state (i.e., a specific state) where the line of vision Sd of the driver Dr of the host vehicle HV detected by the driver monitor device 60 is not directed to the front laterally moving target object having the minimum estimated time to crossing ETC" is occurring. Hereinafter, the front laterally moving target object having the minimum estimated time to crossing ETC is sometimes referred to as a "control priority object". Therefore, it can be said that, at step 440, the CPU determines whether or not the state (i.e., the specific state) where the driver Dr is not watching (visually recognizing) the control priority object is occurring. It should be noted that the CPU determines that the line of vision Sd of the driver Dr is not directed to the control priority object, when a position of the control priority object is not included in a sector area, having a center axis that coincides with the line of vision Sd of the driver Dr, whose central angle is a predetermined angle (e.g., around from 10° to 20°) and whose center is at a position of the eye of the driver Dr.

When the state where the line of vision Sd of the driver Dr is not directed to the control priority object (namely, the state where the driver Dr is not watching (visually recognizing) the control priority object) is occurring, the CPU makes a "Yes" determination at step 460, and proceeds to step 470. At step 470, the CPU sets a value of the start moving suppression flag Xr to "1". Thereafter, the CPU proceeds to step 495 to terminate the present routine tentatively. It should be noted that the value of the start moving suppression flag Xr is set to "0" through an initialization routine that is executed by the CPU when a position of an unillustrated ignition key switch of the host vehicle HV is changed from an off position to an on position.

When the CPU makes a "No" determination at step at any one of steps 410, 420, 440, and 460, the CPU proceeds to step 480 from the step at which the CPU makes a "No" determination. At step 480, the CPU sets the value of the start moving suppression flag Xr to "0". Thereafter, the CPU proceeds to step 495 to terminate the present routine tentatively.

Start Moving Suppression Control and Warning Control

Figure 5:
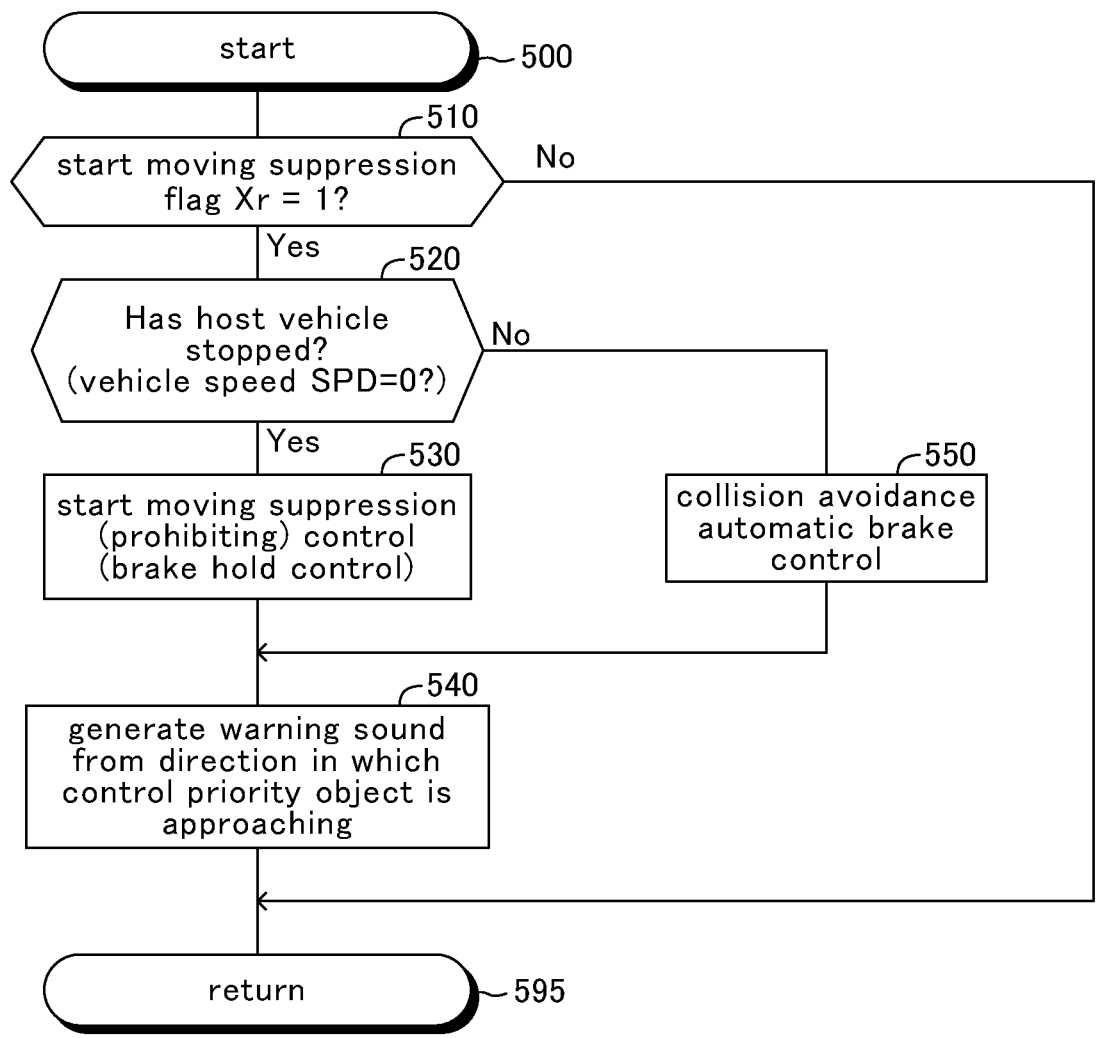
FIG. 5 is a flowchart illustrating a routine executed by the CPU of the driving assistance ECU shown in FIG. 1.

When an appropriate time point comes, the CPU starts processing from step 500 in FIG. 5, and proceeds to step 510. At step 510, the CPU determines whether or not the value of the start moving suppression flag Xr is "1". When the value of the start moving suppression flag Xr is not "1" (i.e., is "0"), the CPU makes a "No" determination at step 510, and directly proceeds to step 595 to terminate the present routine tentatively.

Whereas, when the value of the start moving suppression flag Xr is "1", the CPU makes a "Yes" determination at step 510, and proceeds to step 520. At step 520, the CPU determines whether or not the host vehicle HV has stopped (i.e., whether or not the vehicle speed SPD is equal to "0").

When the host vehicle HV has stopped, the CPU makes a "Yes" determination at step 520, and proceeds to step 530. At step 530, the CPU performs a brake hold control as a host vehicle traveling suppression control (start moving suppression control). More specifically, the CPU controls the brake actuator 81 through the brake ECU 80 in such a manner that a "large brake force that can prevent the host vehicle HV from moving (starting) even when the host vehicle HV has stopped on a sloping road" is forcefully/automatically applied to the host vehicle HV. This brake hold control is the host vehicle traveling suppression control that applies the brake force to the host vehicle HV so as to prevent the host vehicle HV from reaching the predicted intersecting position which is a position at which the predicted traveling path of the host vehicle HV and the predicted path of a target control object that is the control priority object intersect with each other. Furthermore, the CPU controls the power train actuator 71 through the power train ECU 70 in such a manner that the driving force of the host vehicle HV does not increase even when the driver Dr of the host vehicle HV operates the acceleration pedal. Namely, the CPU forcefully maintains the host vehicle HV in a stopped state at step 530.

It should be noted that the power train ECU 70 controls the power train actuator 71 in such a manner that a driving force that is equal to a target driving force determined based on the acceleration pedal operation amount AP and the vehicle speed SPD is applied to the host vehicle HV, when the value of the start moving suppression flag Xr is "0". Thus, when the value of the start moving suppression flag Xr is "0" and the acceleration pedal operation amount AP is equal to "0" since the driver Dr takes his/her foot off the acceleration pedal, the power train EUC 70 applies a so-called creep force that is a predetermined driving force causing the host vehicle HV to creep to the host vehicle HV.

Figure 6:
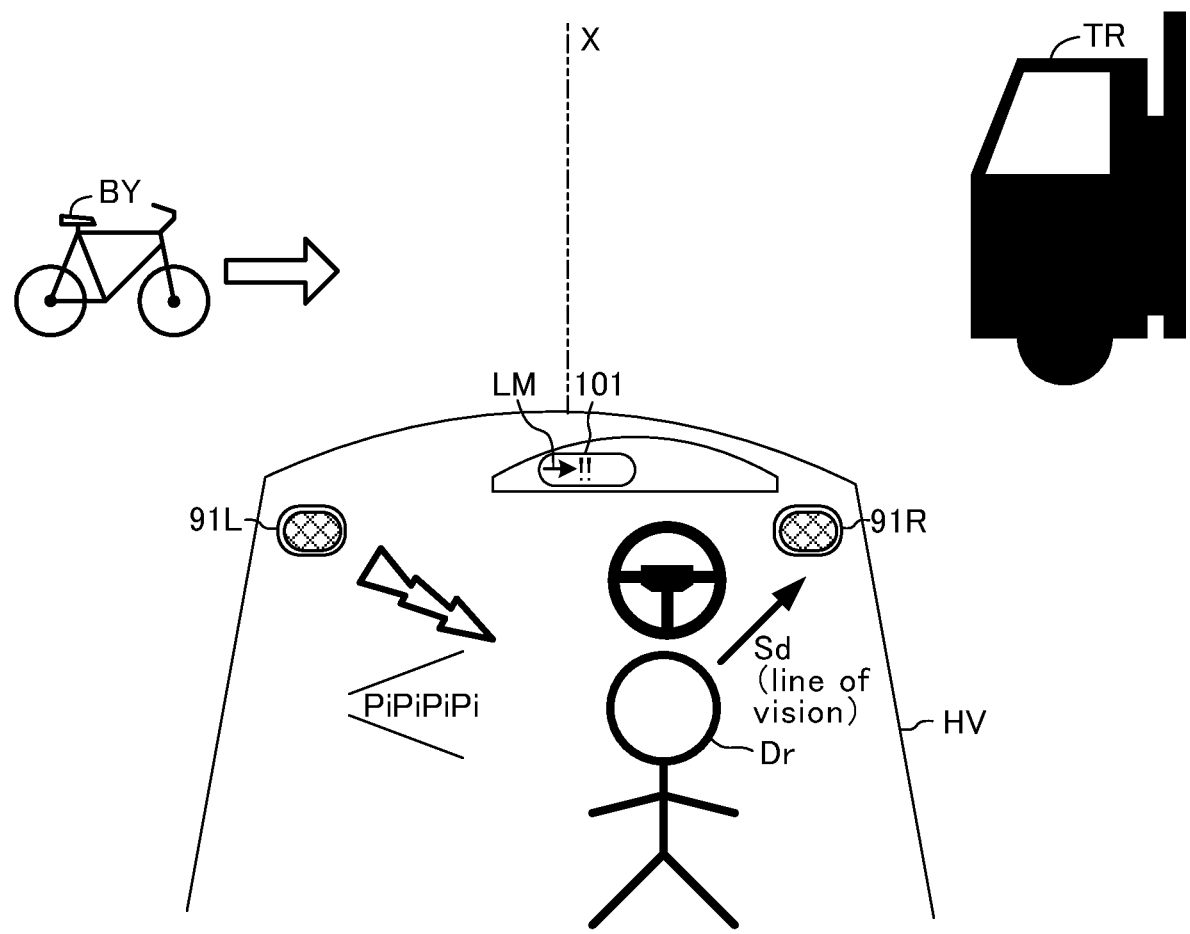
FIG. 6 is a drawing for describing operations of the vehicle driving assistance apparatus shown in FIG. 1.

Subsequently, the CPU proceeds to step 540 so as to perform the attention seeking warning control (visual guidance warning process). More specifically, the CPU specifies from which side of the right side and the left side with respect to the X axis of the host vehicle HV the control priority object is approaching the host vehicle HV (more precisely, the predicted intersecting position between the host vehicle HV and the control priority object). When the CPU determines that the control priority object (e.g., the bicycle BY) is approaching to the predicted intersecting position from the left side with respect to the X axis, the CPU causes only the left speaker 91L among the left speaker 91L and the right speaker 91R to generate a predetermined warning sound (e.g., the sound of "pi-pi-pi") by sending an instruction to the warning ECU 90, as shown in FIG. 6.

It should be noted that, in this case, the warning ECU 90 may cause both of the left speaker 91L and the right speaker 91R to generate the warning sounds as long as the driver Dr of the host vehicle HV can recognize that the warning sound is generated from the left side of the driver Dr (that a warning sound source that is a source of the warning sound is located in the left side of the driver Dr). Namely, the warning ECU 90 may utilize a stereo effect to adjust the direction (position) of the warning sound source.

Whereas, when the CPU determines that the control priority object is approaching to the predicted intersecting position from the right side with respect to the X axis, the CPU causes only the right speaker 91R among the left speaker 91L and the right speaker 91R to generate the predetermined warning sound (e.g., the sound of "pi-pi-pi") by sending an instruction to the warning ECU 90.

In this case as well, the warning ECU 90 may cause both of the left speaker 91L and the right speaker 91R to generate the warning sounds as long as the driver Dr of the host vehicle HV can recognize that the warning sound is generated from the right side of the driver Dr (that a warning sound source is located in the right side of the driver Dr). Namely, the warning ECU 90 may utilize the stereo effect to adjust the direction (position) of the warning sound source.

In contrast, if the host vehicle HV has not stopped when the CPU proceeds to step 520 shown in FIG. 5, the CPU makes a "No" determination at step 520, and proceeds to step 550. At step 550, the CPU performs a collision avoidance automatic brake control.

More specifically, the CPU obtains through calculation, as a target deceleration, a deceleration necessary for the host vehicle HV to stop at a target stop position. In the present example, the target stop position is a position a predetermined margin distance away toward the host vehicle HV from the predicted intersecting position of the control priority object. Thereafter, the CPU controls the brake actuator 81 through the brake ECU 80 in such a manner that an actual deceleration of the host vehicle HV becomes equal to the target deceleration. This automatic brake control is the collision avoidance automatic brake control. The collision avoidance automatic brake control is also one of the host vehicle traveling suppression control that applies the brake force to the host vehicle HV so as to prevent the host vehicle HV from reaching the predicted intersecting position. Thereafter, the CPU executes the above-described process of step 540, and proceeds to step 595 to terminate the present routine tentatively.

It should be noted that the above-described margin distance may be equal to or greater than "0", but may preferably be a constant positive distance (e.g., a distance between 50 cm and 1 m). In addition, the target stop position may be an entrance position on the predicted traveling path Ehv of the host vehicle of the intersection IN that the host vehicle is going to enter (i.e., a connecting position between a road on which the host vehicle HV is traveling and a road intersecting with the road on which the host vehicle HV is traveling), or the target stop position may be a position a predetermined margin distance away toward the host vehicle HV from the entrance position.

As described above, when the driving assistance apparatus DS determines that the specific state where the line of vision of the driver of the host vehicle is not directed to a "target object that is predicted to reach a position at which the target object is predicted to intersect with the predicted traveling path of the host vehicle at the earliest (time) among the target intersecting objects" is occurring (step 460: Yes), the driving assistance apparatus DS performs the brake hold control as the host vehicle traveling suppression control if the host vehicle has stopped (step 530), and performs the collision avoidance automatic brake control as the host vehicle traveling suppression control if the host vehicle has not stopped (step 550). Furthermore, even when the acceleration pedal of the host vehicle is operated while the driving assistance apparatus DS is performing the brake hold control, the driving assistance apparatus DS performs a start moving driving force suppression control to control the drive source of the host vehicle in such a manner that "a driving force equal to or smaller than the creeping force that is applied to the host vehicle when the acceleration pedal of the host vehicle is released (not operated)" is applied to the host vehicle.

Therefore, the driving assistance apparatus DS can decrease a possibility that the near-collision (abnormal closeness) between the host vehicle and the target control object occurs.

In addition, when the above-described specific state is occurring, the driving assistance apparatus DS performs the attention seeking warning control (step 540) to generate the warning sound in such a manner that the driver of the host vehicle can recognize that there is the warning sound source in either the left direction or the right direction along which the target control object (that is the control priority object) is approaching the host vehicle.

Accordingly, the driving assistance apparatus DS can also decrease the possibility that the near-collision (abnormal closeness) between the host vehicle and the target control object occurs, with/using the warning sound.

Modification

Figure 7:
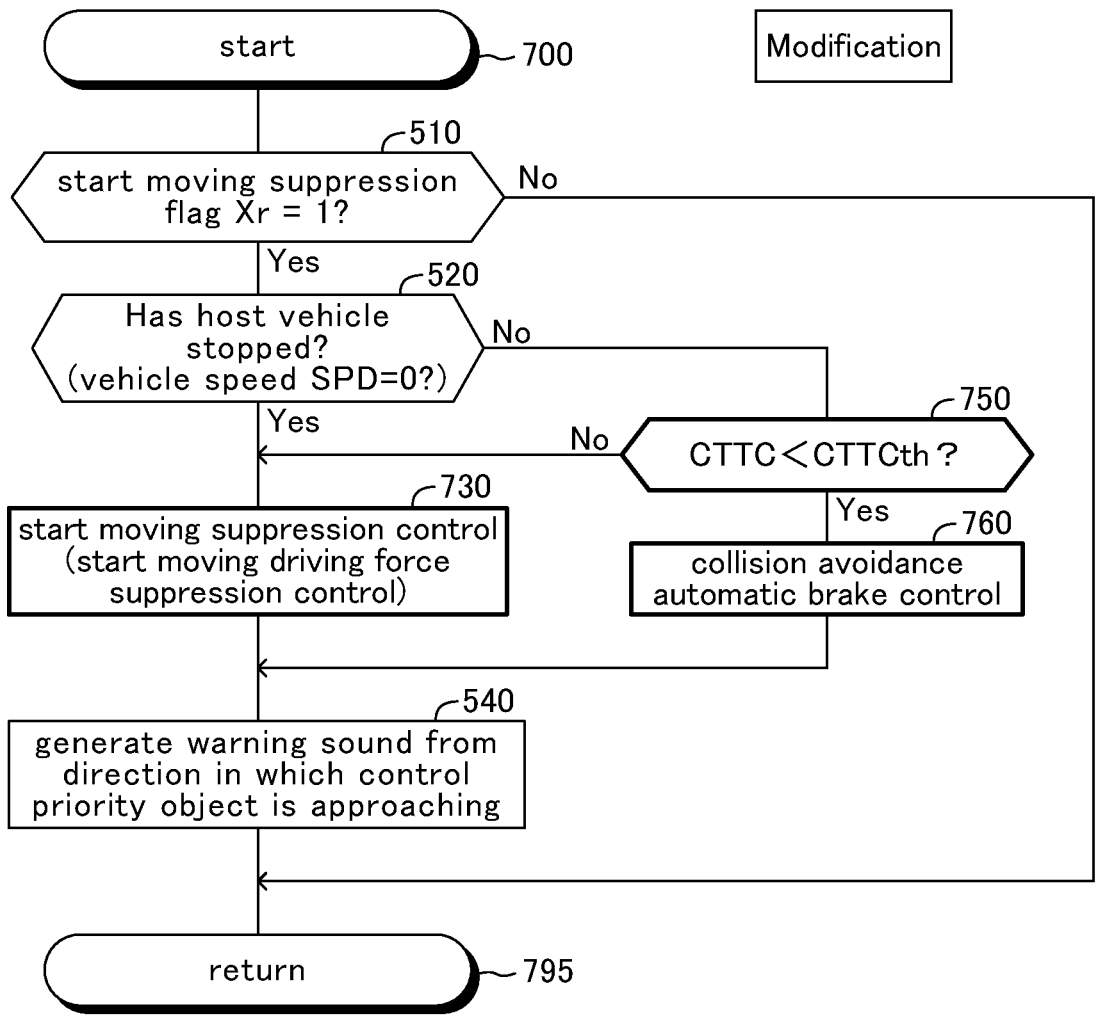
FIG. 7 is a flowchart illustrating a routine executed by a CPU of a modification of the driving assistance ECU shown in FIG. 1.
Figure 8:
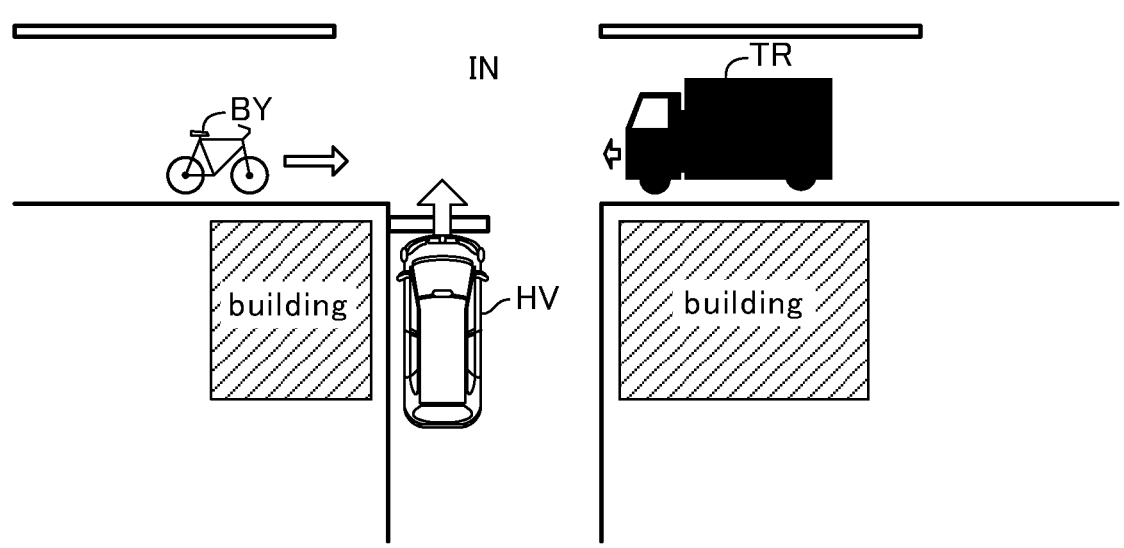
FIG. 8 is a drawing showing a specific scene for describing operations of the conventional vehicle driving assistance apparatus.

A modification of the driving assistance apparatus DS is different from the driving assistance apparatus DS only in that the CPU of the driving assistance ECU 10 of the modification executes a routine shown by a flowchart in FIG. 7 in place of the flowchart shown in FIG. 5.

More specifically, when an appropriate time point comes, the CPU of the driving assistance ECU 10 of the modification starts processing from step 700 shown in FIG. 7. It should be noted that steps in the routine shown by the flowchart shown in FIG. 7 that are the same as the steps shown in FIG. 5 are given reference symbols of the respective steps shown in FIG. 5, and the descriptions thereof may sometimes be omitted.

It is now assumed that the value of the start moving suppression flag Xr is set at "1" and the host vehicle HV has stopped. Under this assumption, the CPU makes a "Yes" determination at each of the "steps 510 and 520" in FIG. 7, and proceeds to step 730.

At step 730, the CPU performs a start moving driving force suppression control as the start moving suppression control. More specifically, the CPU controls the power train actuator 71 through the power train ECU 70 in such a manner that the driving force of the host vehicle HV does not increase even when the driver Dr of the host vehicle HV operates the acceleration pedal. Namely, the driving force applied to the host vehicle HV is adjusted to a force equal to or smaller than the creeping force of when the acceleration pedal is not operated. This control is the driving force suppression control. Thereafter, the CPU proceeds to step 540 shown in FIG. 7 so as to perform the attention seeking warning control, and proceeds to step 795 to terminate the present routine tentatively.

Whereas, if the host vehicle HV has not stopped (i.e., is moving) when the CPU proceeds to step 520 shown in FIG. 7, the CPU makes a "No" determination at step 520, and proceeds to step 750.

At step 750, the CPU obtains a crossing time to collision CTTC (estimated time to collision) according to the following equation.

crossing time to collision $CTTC = (Dhv - M\alpha)/SPD$

Here, Dhv is a distance between a "position of the host vehicle HV at the present time point" and the "predicted intersecting position at which the host vehicle HV and the control priority object are predicted to intersect with each other". Mα is a predetermined margin distance (that is "0" or a positive value). SPD is the vehicle speed of the host vehicle HV.

Furthermore, at step 750, the CPU determines whether or not the crossing time to collision CTTC is shorter than a predetermined time to collision threshold CTTCth. When the crossing time to collision CTTC is equal to or longer than the collision threshold CTTCth, the CPU makes a "No" determination at step 750, and proceeds to the above-described step 730.

Whereas, when the crossing time to collision CTTC is shorter than the collision threshold CTTCth, the CPU makes a "Yes" determination at step 750, and proceeds to step 760. At step 760, the CPU perform the collision avoidance automatic brake control similar to the control carried out at the above-described step 550. Thereafter, the CPU proceeds to step 540 shown in FIG. 7 so as to perform the above-described attention seeking warning control, and proceeds to step 795 to terminate the present routine tentatively.

As described above, the modification of the driving assistance apparatus DS determines that the specific state where the line of vision of the driver of the host vehicle is not directed to a "target object that is predicted to reach a position at which the target object is predicted to intersect with the predicted traveling path of the host vehicle at the earliest (time) among the target intersecting objects" is occurring (step 460: Yes), the driving assistance apparatus DS performs the start moving driving force suppression control to control the drive source of the host vehicle in such a manner that the diving force equal to or smaller than the creeping force that is applied to the host vehicle when the acceleration pedal of the host vehicle is released (not operated) is applied to the host vehicle, if the host vehicle has stopped, even when the acceleration pedal is operated (step 730).

Consequently, even if the driver release (takes his/her foot off) the brake pedal and presses on the acceleration pedal, the host vehicle starts slowly/gently. Therefore, a possibility that the driver of the host vehicle notices/recognizes the target control object and stops the host vehicle is increased. Accordingly, the modification can decrease the possibility that the near-collision (abnormal closeness) between the host vehicle and the target control object occurs.

The present disclosure should not be limited to the above-described embodiment and the modification, and may employ various other modifications within the scope of the present disclosure.

For example, the driving assistance apparatus DS may be configured to perform only one of the host vehicle traveling suppression control and the attention seeking warning control. The driving assistance apparatus DS may be applied to an autonomous control vehicle.

In addition, the front left side radar 41 and the front right side radar 51 may be preplaced with a front left side camera that can take a picture of a scene in front of and the left side of the host vehicle and a front right side camera that can take a picture of a scene in front of and the right side of the host vehicle, respectively. Furthermore, the front left side radar 41 and the front right side radar 51 may be preplaced with a single sensor (e.g., a LiDAR) that can detect a target object present in an whole area (including the side of the host vehicle) in front of the host vehicle.

What is claimed is:

1. A vehicle driving assistance apparatus A comprising:

one or more of sensors configured to be capable of obtaining information on a target object that is present in front of a host vehicle on the left and a target object that is present in front of said host vehicle on the right;

a driver monitor device configured to be capable of detecting a line of vision of a driver of said host vehicle; and a control unit configured to, when said control unit determines, based on said information obtained by said one or more of sensors, that at least one target intersecting object that is a target object approaching from a side of said vehicle to a predicted traveling path of said host vehicle so as to intersect with said predicted traveling path of said host vehicle is present, and when said control unit determines that a specific state in which said line of vision of said driver detected by said driver monitor device is not directed to a target control object is occurring, wherein said target control object is a target object that is predicted to reach a position at which said target object is predicted to intersect with said predicted traveling path of said host vehicle at the earliest time among said target intersecting objects, perform at least one of a host vehicle traveling suppression control and an attention seeking warning control, said host vehicle traveling suppression control being a control to automatically apply a brake force to said host vehicle, using a brake device of said host vehicle, in such a manner that said host vehicle does not reach a predicted intersecting position at which said predicted traveling path of said host vehicle and a predicted path of said target control object intersect with each other, and said attention seeking warning control being a control to generate a warning sound to said driver, using a warning device of said host vehicle, so as to cause said driver to recognize that there is a warning sound source in either a left direction or a right direction along which said target control object is approaching said host vehicle, wherein, said control unit is configured to, if said host vehicle is in a stopped state when said specific state is determined to be occurring, perform, as said host vehicle traveling suppression control, a brake hold control being a control to forcefully apply a brake force for stopping said host vehicle to said host vehicle, using said brake device of said host vehicle, in such a manner that said host vehicle continues being stopped.

2. The vehicle driving assistance apparatus according to claim 1, wherein, said control unit is configured to, if said host vehicle is not in said stopped state when said specific state is determined to be occurring, perform, as said host vehicle traveling suppression control, a collision avoidance automatic brake control to forcefully apply a brake force for avoiding a collision to said host vehicle, using said brake device of said host vehicle, in such a manner that said host vehicle stops in front of said predicted intersecting position.

3. The vehicle driving assistance apparatus according to claim 1,
wherein, said control unit is configured to:
obtain an intersecting time length that is a time length for said target control object to reach said predicted intersecting position; and
starts at least one of said host vehicle traveling suppression control and said attention seeking warning control, when said intersecting time length is shorter than an intersecting time length threshold.

4. A vehicle driving assistance apparatus comprising:
one or more of sensors configured to be capable of obtaining information on a target object that is present in front of a host vehicle on the left and a target object that is present in front of said host vehicle on the right;
a driver monitor device configured to be capable of detecting a line of vision of a driver of said host vehicle; and
a control unit configured to,
when said control unit determines, based on said information obtained by said one or more of sensors, that at least one target intersecting object that is a target object approaching from a side of said vehicle to a predicted traveling path of said host vehicle so as to intersect with said predicted traveling path of said host vehicle is present, and
when said control unit determines that a specific state in which said line of vision of said driver detected by said driver monitor device is not directed to a target control object is occurring, wherein said target control object is a target object that is predicted to reach a position at which said target object is predicted to intersect with said predicted traveling path of said host vehicle at the earliest time among said target intersecting objects,
perform at least one of a host vehicle traveling suppression control and an attention seeking warning control,
said host vehicle traveling suppression control being a control to automatically apply a brake force to said host vehicle, using a brake device of said host vehicle, in such a manner that said host vehicle does not reach a predicted intersecting position at which said predicted traveling path of said host vehicle and a predicted path of said target control object intersect with each other, and
said attention seeking warning control being a control to generate a warning sound to said driver, using a warning device of said host vehicle, so as to cause said driver to recognize that there is a warning sound source in either a left direction or a right direction along which said target control object is approaching said host vehicle,
wherein, said control unit is configured to, if said host vehicle is in a stopped state when said specific state is determined to be occurring, perform a start moving driving force suppression control to control a drive source of said host vehicle in such a manner that a driving force equal to or smaller than a creeping force that is applied to said host vehicle when said acceleration pedal of said host vehicle is released is applied to said host vehicle, even when an acceleration pedal is operated.

5. The vehicle driving assistance apparatus according to claim 4,
wherein, said control unit is configured to:
obtain an intersecting time length that is a time length for said target control object to reach said predicted intersecting position; and
starts at least one of said host vehicle traveling suppression control and said attention seeking warning control, when said intersecting time length is shorter than an intersecting time length threshold.

* * * * *